United States Patent
Sussman

4,128,304
Dec. 5, 1978

[54] ABBE CONDENSER

[75] Inventor: Milton H. Sussman, Amherst, N.Y.

[73] Assignee: American Optical Corporation, Southbridge, Mass.

[21] Appl. No.: 643,980

[22] Filed: Dec. 24, 1975

[51] Int. Cl.$^2$ .......................... G02B 3/04; G02B 9/12; G02B 9/06

[52] U.S. Cl. .................................. 350/189; 350/228; 350/231; 350/175 ML

[58] Field of Search ............... 350/189, 230, 231, 228, 350/87, 175 ML

[56] References Cited

U.S. PATENT DOCUMENTS

| | | | |
|---|---|---|---|
| 2,427,689 | 9/1947 | Osterberg et al. ........... | 350/175 ML |
| 2,637,242 | 5/1953 | Osterberg et al. ................... | 350/189 |
| 3,743,386 | 7/1973 | Aklin et al. .............. | 350/175 ML X |
| 3,914,025 | 10/1975 | Dehlink ................... | 350/175 ML X |
| 3,951,523 | 4/1976 | Nishimoto ........................... | 350/189 |

*Primary Examiner*—Paul A. Sacher
*Attorney, Agent, or Firm*—Jeremiah J. Duggan; Alan H. Spencer

[57] ABSTRACT

A two-component microscope condenser consisting of a biconvex positive doublet as the first component and a convex-plano positive doublet as the second component has excellent correction for spherical aberration and coma with significant reduction of pupillary aberration. The front pupil plane of the condenser is located external to the glass in order to provide utility of the condenser in microscope techniques requiring positioning of optical elements in the pupil plane. A negative lens may be combined with one embodiment of the invention to provide a longer working distance.

12 Claims, 3 Drawing Figures

ABBE CONDENSER

BACKGROUND OF THE INVENTION

This invention relates to Abbe condensers and more particularly to improved Abbe condensers having excellent correction for spherical aberration and coma with significant reduction in the usual pupillary aberration.

Abbe condensers are well known and conventionally have a biconvex first element with a convex-plano second element. However, the first and second elements have been singlets except in the case of extremely complex condensers having a substantial number of additional components and usually having a triplet as the first element. Thus, microscopists either had to be satisfied with amounts of spherical aberration and coma, as well as pupillary aberration that were commonly present in conventional Abbe condensers or make a considerable investment for a complex condenser system in order to perform microscopy techniques hindered or prevented by conventional Abbe condensers.

It is an object of the present invention to provide an improved Abbe condenser.

It is another object of the present invention to provide an Abbe condenser having excellent correction for spherical aberration and coma and being well corrected for pupillary aberrations.

It is a further object of the present invention to provide an improved Abbe condenser with significantly reduced axial color aberration.

It is a still further object of the present invention to provide an Abbe condenser consisting of a biconvex positive doublet and a convex-piano positive doublet.

It is also another object of the present invention to provide an improved Abbe condenser of close working distance that can have the working distance increased by a negative lens.

BRIEF DESCRIPTION OF THE PRESENT INVENTION AND DRAWINGS

Improved Abbe condensers have two components with the first component being a biconvex positive doublet and the second component being a convex-piano positive doublet. The improved condensers have excellent correction for spherical aberration and coma, as well as significantly reduced pupillary aberration.

DESCRIPTION OF THE EMBODIMENTS

Figure 1:
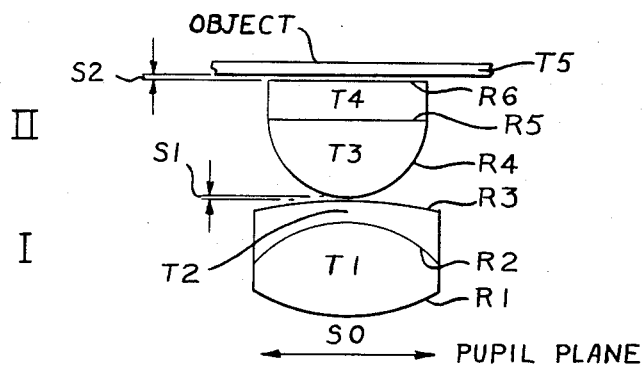
FIG. 1 is an optical diagram of one embodiment of the present invention.

The condenser, as shown in FIG. 1, has a numerical aperture of approximately 0.90, excellent correction for spherical aberration and comma and significant reduction of pupillary aberration. Referring to FIG. 1, a biconvex positive doublet I consists of a biconvex singlet cemented to a concavo-convex singlet and is the first element of the condenser. A convex-plano positive doublet II is axially aligned with biconvex positive doublet I and is the other component of the condenser system.

The lens parameters of the two components are given in Table I with lens radii designated as $R_1$ to $R_6$, a minus sign (−) indicates the center of curvature on the pupil side of the lens, thicknesses are designated $T_1$ to $T_4$, spacings are designated $S_0$ to $S_2$, indices of refraction are designated $ND_1$ to $ND_4$ and Abbe numbers are designated $\nu_1$ to $\nu_4$. X is a variable having a value of about 9 to 13mm.

TABLE I

| Lens | Radius | Thickness | Spacing | Index of Refraction | Abbe Number |
|---|---|---|---|---|---|
| | | | $S_0=0.3562X$ | | |
| | $R_1= 1.9558X$ | $T_1=0.9662X$ | | $1.620<ND_{(1)}<1.621$ | $\gamma_{(1)}\approx 60$ |
| I | $R_2=-1.2632X$ | $T_2=0.1905X$ | | $1.78<ND_{(2)}<1.79$ | $\gamma_{(2)}\approx 25$ |
| | $R_3=-4.3594X$ | | $S_1=0.0095X$ | | |
| | $R_4= 0.8097X$ | $T_3=0.7669X$ | | $1.66<ND_{(3)}<1.67$ | $\gamma_{(3)}\approx 42$ |
| II | $R_5=\infty$ | $T_4=0.3900X$ | | $1.78<ND_{(4)}<1.79$ | $\gamma_{(4)}\approx 25$ |
| | $R_6=\infty$ | | $S_2=0.0286X$ | | |
| | | $T_5=0.1190X$ | | $1.52<ND_{(5)}<1.53$ | $\gamma_{(5)}\approx 58$ |

$T_5$, $ND_5$ and $\nu_5$, given in the above Table, are respresentative of conventional microscope slides. While illustrated in the drawing and defined in the Table, the slide does not form a part of the present invention. Those skilled in the art can easily adapt the condenser system to a slide of unusual thickness or having an unusual index of refraction and Abbe number.

A preferred embodiment, where $X=10.5$mm, has the following values:

TABLE II

| Lens | Radius | Thickness | Spacing | Index of Refraction | Abbe Number |
|---|---|---|---|---|---|
| | | | $S_0=3.74$ | | |
| | $R_1= 20.5357$ | $T_1=10.145$ | | $ND_1=1.6203$ | $\gamma_1=60.3$ |
| I | $R_2=-13.2638$ | $T_2=2.000$ | | $ND_2=1.78600$ | $\gamma_2=25.5$ |
| | $R_3=-45.7739$ | | $S_1=0.10$ | | |
| | $R_4= 8.5021$ | $T_3=8.053$ | | $ND_3=1.66741$ | $\gamma_3=41.9$ |
| II | $R_5=\infty$ | $T_4=4.095$ | | $ND_4=1.78600$ | $\gamma_4=25.5$ |
| | $R_6=\infty$ | | $S_2=0.30$ | | |
| | | $T_5=1.250$ | | $ND_5=1.5244$ | $\gamma_5=58.3$ |

Figure 2:
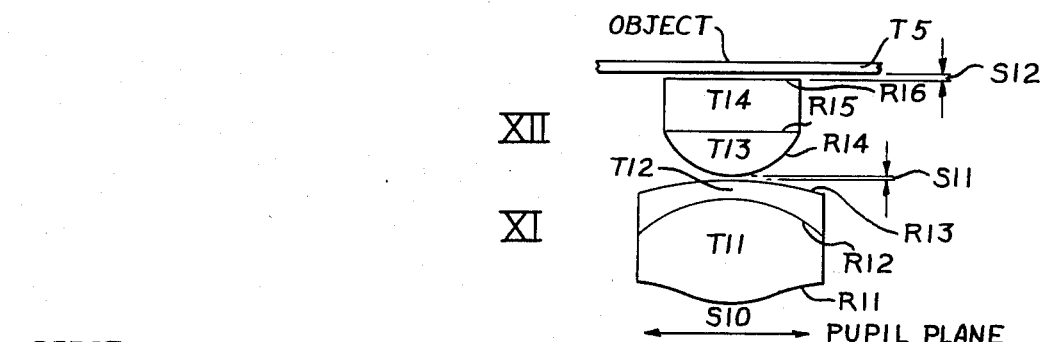
FIG. 2 is an optical diagram of another embodiment of the present invention.

The embodiment of FIG. 2 has a biconvex positive doublet XI as the first element being composed of a biconvex singlet, the first surface of which is an axially symmetrical aspherical surface and a concavo-convex singlet cemented thereto. The second element is axially aligned with the biconvex positive doublet XI and is a convex-plano positive doublet XII composed of a convex-plano singlet cemented to a plano plate.

The lens parameters of the two components are given in Table III with lens radii designated as $R_{11}$ to $R_{16}$, a minus sign (−) indicates the center of curvature on the pupil side of the lens, thicknesses are designated $T_{11}$ to $T_{14}$, spacings are designated $S_{10}$ to $S_{12}$, indices of refraction are designated $ND_{11}$ to $ND_{14}$ and Abbe numbers are designated $\nu_{11}$ to $\nu_{14}$.

TABLE III

| Lens | Radius | Thickness | Spacing | Index of Refraction | Abbe Number |
|---|---|---|---|---|---|
|  |  |  | $S_{10}=0.2894X$ |  |  |
|  | $R_{11}=$ 1.2120X | $T_{11}=1.0311X$ |  | $1.522<ND_{11}<1.524$ | $\gamma_{11}\approx 58$ |
| XI | $R_{12}=-1.4414X$ | $T_{12}=0.1905X$ |  | $1.785<ND_{12}<1.787$ | $\gamma_{12}\approx 25$ |
|  | $R_{13}=-3.3477X$ |  | $S_{11}=0.0095X$ |  |  |
|  | $R_{14}=$ 0.7720X | $T_{13}=0.4264X$ |  | $1.619<ND_{13}<1.621$ | $\gamma_{13}\approx 60$ |
| XII | $R_{15}=\infty$ | $T_{14}=0.5212X$ |  | $1.785<ND_{14}<1.787$ | $\gamma_{14}\approx 25$ |
|  | $R_{16}=\infty$ |  | $S_{12}=0.0381X$ |  |  |
|  |  | $T_5=0.1190X$ |  | $1.52<ND_5<1.53$ | $\gamma_5\approx 58$ | wherein X is 9 to 13mm, the front surface of lens XI, with radius $R_{11}$, is an axially symmetrical aspheric surface with axis of rotation Z. The value of Z, for any given value of x and y, is defined by the equation $$Z = \frac{cp^2}{1+\sqrt{1-(k+1)c^2p^2}} + dp^4 + ep^6 + fp^8 + gp^{10}$$

Wherein:
$d=0.380331\cdot 10^{-5}$
$e=-0.428527\cdot 10^{-7}$
$f=0.124135\cdot 10^{-8}$
$g=-0.709653\cdot 10^{-11}$
$p^2=x^2+y^2$
$c=1/R_{11}$, and
$k=-0.536389$ An embodiment, where X is 10.5mm, has the following values:

TABLE IV

| Lens | Radius | Thickness | Spacing | Index of Refraction | Abbe Number |
|---|---|---|---|---|---|
|  |  |  | $S_{10}=3.04$ |  |  |
|  | *$R_{11}=$ 12.727 | $T_{11}=10.826$ |  | $ND_{11}=1.523$ | $\gamma_{11}=58.6$ |
| XXI | $R_{12}=-15.135$ | $T_{12}=2.000$ |  | $ND_{12}=1.786$ | $\gamma_{12}=25.5$ |
|  | $R_{13}=-35.151$ |  | $S_{11}=0.10$ |  |  |
|  | $R_{14}=$ 8.107 | $T_{13}=4.477$ |  | $ND_{13}=1.620$ | $\gamma_{13}=60.3$ |
| XXII | $R_{15}=\infty$ | $T_{14}=5.473$ |  | $ND_{14}=1.786$ | $\gamma_{14}=25.5$ |
|  | $R_{16}=\infty$ |  | $S_{12}=0.40$ |  |  |
|  |  | $T_5=1.250$ |  | $ND_5=1.5244$ | $\gamma_5=58.3$ |

*Aspheric surface having conic coefficient and four deformation coefficients given in Table III.

Another embodiment of the condenser according to FIG. 2 has the following parameters:

TABLE V

| Lens | Radius | Thickness | Spacing | Index of Refraction | Abbe Number |
|---|---|---|---|---|---|
|  |  |  | $S_{10}=0.163X$ |  |  |
|  | $R_{11}=$ 1.261X | $T_{11}=1.085X$ |  | $1.5<ND_{11}<1.6$ | $\gamma_{11}\approx 59$ |
| XI | $R_{12}=-1.385X$ | $T_{12}=0.271X$ |  | $1.7<ND_{12}<1.8$ | $\gamma_{12}\approx 25$ |
|  | $R_{13}=-2.891X$ |  | $S_{11}=0.009X$ |  |  |
|  | $R_{14}=$ 0.719X | $T_{13}=0.414X$ |  | $1.5<ND_{13}<1.6$ | $\gamma_{13}\approx 61$ |
| XII | $R_{15}=\infty$ | $T_{14}=0.5423X$ |  | $1.7<ND_{14}<1.8$ | $\gamma_{14}\approx 25$ |
|  | $R_{16}=\infty$ |  | $S_{12}=0.036X$ |  |  | where X is 9 to 13mm and the conic coefficient and four deformation coefficients are:
$d=0.335486\cdot 10^{-5}$
$e=-0.329104\cdot 10^{-7}$
$f=0.70309\cdot 10^{-9}$
$g=-0.349273\cdot 10^{-11}$
$p^2=x^2+y^2$
$c=1/R_{11}$, and
$k=-0.556707$ The preferred embodiment, where X is 11.4mm and has the following values:

TABLE VI

| Lens | Radius | Thickness | Spacing | Index of Refraction | Abbe Number |
|---|---|---|---|---|---|
|  |  |  | $S_{10}=1.86$ |  |  |
|  | *$R_{11}=$ 14.375 | $T_{11}=12.37$ |  | $ND_{11}=1.523$ | $\gamma_{11}=58.6$ |
| XI | $R_{12}=-15.792$ | $T_{12}=3.09$ |  | $ND_{12}=1.786$ | $\gamma_{12}=25.5$ |

TABLE VI-continued

| Lens | Radius | Thickness | Spacing | Index of Refraction | Abbe Number |
|---|---|---|---|---|---|
| XII | $R_{13}=-32.960$ | | $S_{11}=0.10$ | | |
|  | $R_{14}=8.194$ | $T_{13}=4.72$ | | $ND_{13}=1.589$ | $\gamma_{13}=61.2$ |
|  | $R_{15}=\infty$ | $T_{14}=6.18$ | | $ND_{14}=1.786$ | $\gamma_{14}=25.5$ |
|  | $R_{16}=\infty$ | | $S_{12}=0.411$ | | |

*Aspheric surface having conic coefficient and four deformation coefficients given in Table V.

Figure 3:
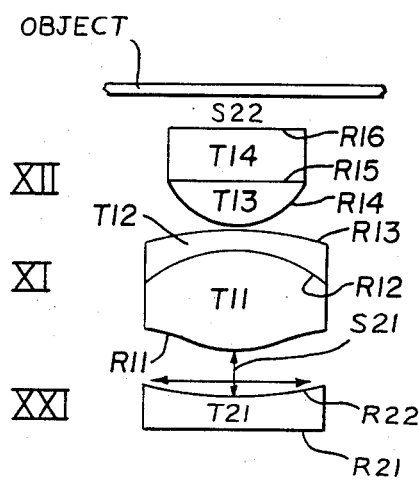
FIG. 3 is an optical diagram of still another embodiment of the present invention.

Referring to FIG. 3, lenses XI and XII are the same as the corresponding lenses of FIG. 2. Lens XXI is a negative throwin lens which can be optionally used with lenses XI and XII to increase the working distance of the condenser.

The parameters of lens XXI are as follows:

$R_{21}$ is from about −250 to =500mm, $R_{22}$ is from about 62.0 to 23mm, $T_{21}$ is from about 3.2 to 4.0mm; $S_{21}$ is from about 4.2 to 5.4mm, $ND_{21}$ is from about 1.6 to 1.8 and $\nu_{21}$ is about 31. The specific values of the above parameters are selected to provide the desired condenser working distance according to the formula $$\frac{f^2 \text{ cond}}{\text{working distance} - 1.05} = f \text{ neg. lens}$$

where f cond is the focal length of the condenser, working distance is the space $S_{22}$ and f neg lens is the focal length of the appropriate negative lens. For the condenser of Table VI having a focal length of 11.4, the value of f neg lens may range from about −32.9 to −89.6 to provide an air working distance of about 5mm to 2.5mm. A preferred negative lens XXI has the following values:

$R_{21} = \infty$
$R_{22} = 39.779$
$T_{21} = 3.60$
$ND_{21} = 1.689$
$\nu_{21} = 30.9$ $S_{22}$ is then equal to about 3.3mm and $S_{21}$ is about 3mm. The space, $S_{21}$, is not critical and is preferably selected relative to the sag of the surface with radius $R_{22}$ to provide sufficient clearance for an optical element, such as a phase annulus which is preferably located in or very near the front focal plane, $S_{10}$, of the condenser.

What is claimed is:

1. A two-component microscope condenser having a working distance effective for either an air space or oil filled space and having a front pupil plane external to the glass thereof, said condenser consisting of a biconvex positive doublet and a convex-plano positive doublet aligned along an optical axis.

2. The condenser of claim 1 wherein said biconvex doublet has an aspherical first surface.

3. The condenser of claim 2 in which said two components have parameters of lens radii (R), a minus sign (−) indicates center of curvature on the pupil side of the lens, thicknesses (T), spacings (S), indices of refraction (ND) and Abbe numbers ($\nu$) as follows:

| Lens | Radius | Thickness | Spacing | Index of Refraction | Abbe Number |
|---|---|---|---|---|---|
| | | | $S_{10}=0.2894X$ | | |
| I | $R_{11}= 1.2120X$ | $T_{11}=1.0311X$ | | $1.522 < ND_{11} < 1.524$ | $\gamma_{11} \approx 58$ |
| | $R_{12}=-1.4414X$ | $T_{12}=0.1905X$ | | $1.785 < ND_{12} < 1.787$ | $\gamma_{12} \approx 25$ |
| | $R_{13}=-3.3477X$ | | $S_{11}=0.0095X$ | | |
| II | $R_{14}= 0.7720X$ | $T_{13}=0.4264X$ | | $1.619 < ND_{13} < 1.621$ | $\gamma_{13} \approx 60$ |
| | $R_{15}=\infty$ | $T_{14}=0.5212X$ | | $1.785 < ND_{14} < 1.787$ | $\gamma_{14} \approx 25$ |
| | $R_{16}=\infty$ | | $S_{12}=0.0381X$ | | | wherein X is 9 to 13mm, the surface having radius $R_{11}$ is an axially symmetrical aspherical surface conforming to the equation $$Z = \frac{cp^2}{1 + \sqrt{1 - (k+1)c^2 p^2}} dp^4 + ep^6 + fp^8 + gp^{10}.$$

with a conic coefficient (k) of −0.536389 and deformation coefficients d of $0.380331 \cdot 10^{-5}$, e of $-0.428527 \cdot 10^{-7}$, f of $0.124135 \cdot 10^{-8}$ and g of $-0.709653 \cdot 10^{-11}$.

4. The condenser of claim 3 wherein X is 10.5mm, $ND_{11}$ is 1.523, $ND_{12}$ is 1.786, $ND_{13}$ is 1.620, $ND_{14}$ is 1.786, $\nu_{11}$ is 58.6, $\nu_{12}$ is 25.5, $\nu_{13}$ is 60.3 and $\nu_{14}$ is 25.5.

5. The condenser of claim 1 in which said two components have parameters of lens radii (R), a minus sign (−) indicates center of curvature on the pupil side of the lens, thicknesses (T), spacings (S), indicates of refraction (ND) and Abbe numbers ($\nu$) as follows:

| Lens | Radius | Thickness | Spacing | Index of Refraction | Abbe Number |
|---|---|---|---|---|---|
| | | | $S_0=0.3562X$ | | |
| I | $R_1= 1.9558X$ | $T_1=0.9662X$ | | $1.620 < ND_{(1)} < 1.621$ | $\gamma_{(1)} \approx 60$ |
| | $R_2=-1.2632X$ | $T_2=0.1905X$ | | $1.78 < ND_{(2)} < 1.79$ | $\gamma_{(2)} \approx 25$ |
| | $R_3=-4.3594X$ | | $S_1=0.0095X$ | | |
| II | $R_4= 0.8097X$ | $T_3=0.7669X$ | | $1.66 < ND_{(3)} < 1.67$ | $\gamma_{(3)} \approx 42$ |
| | $R_5=\infty$ | $T_4=0.3900X$ | | $1.78 < ND_{(4)} < 1.79$ | $\gamma_{(4)} \approx 25$ |
| | $R_6=\infty$ | | | | |

-continued

| Lens | Radius | Thickness | Spacing | Index of Refraction | Abbe Number |
|------|--------|-----------|---------|---------------------|-------------|
|      |        |           | $S_2 = 0.0286X$ |           |             | wherein X is 9 to 13mm.

6. The condenser of claim 5 wherein X is 10.5, $ND_1$ is 1.6203, $ND_2$ is 1.78600, $ND_3$ is 1.66741, $ND_4$ is 1.78600, $\nu_1$ is 60.3, $\nu_2$ is 25.5, $\nu_3$ is 41.9 and $\nu_4$ is 25.5.

7. The condenser of claim 2 in which said two components have parameters of lens radii (R), a minus sign (—) indicates center of curvature and the pupil side of the lens, thicknesses (T), spacings (S), indies of refraction (ND) and Abbe numbers ($\nu$) as follows:

| Lens | Radius | Thickness | Spacing | Index of Refraction | Abbe Number |
|------|--------|-----------|---------|---------------------|-------------|
|      | $R_{11} = 1.261X$ |  | $S_{10} = 0.163X$ | $1.5 < ND_{11} < 1.6$ | $\gamma_{11} \approx 59$ |
| XI   |        | $T_{11} = 1.085X$ |  |  |  |
|      | $R_{12} = -1.385X$ | $T_{12} = 0.271X$ |  | $1.7 < ND_{12} < 1.8$ | $\gamma_{12} \approx 25$ |
|      | $R_{13} = -2.891X$ |  | $S_{11} = 0.009X$ |  |  |
|      | $R_{14} = 0.719X$ | $T_{13} = 0.414X$ |  | $1.5 < ND_{13} < 1.6$ | $\gamma_{13} \approx 61$ |
| XII  | $R_{15} = \infty$ | $T_{14} = 0.5423X$ |  | $1.7 < ND_{14} < 1.8$ | $\gamma_{14} \approx 25$ |
|      | $R_{16} = \infty$ |  | $S_{12} = 0.036X$ |  |  | wherein X is 9 to 13mm, the surface having radius $R_{11}$ is an axially symmetrical aspheric surface conforming to the equation $$Z = \frac{cp^2}{1 + \sqrt{1 - (k+1)c^2p^2}} + dp^4 + ep^6 + fp^8 + gp^{10}.$$

with a conic coefficient (k) of $-0.556707$, and deformation coefficients d of $0.335486 \cdot 10^{-5}$, e of $-0.329104 \cdot 10^{-7}$, f of $0.70309 \cdot 10^{-9}$ and g of $-0.349273 \cdot 10^{-11}$.

8. The condenser of claim 7 wherein X is 11.4mm, $ND_{11}$ is 1.523, $ND_{12}$ is 1.786, $ND_{13}$ is 1.589, $ND_{14}$ is 1.786, $\nu_{11}$ is 58.6, $\nu_{12}$ is 25.5, $\nu_{13}$ is 61.2 and $\nu_{14}$ is 25.5.

9. The condenser of claim 2 further including a negative lens having a concave rear surface positioned near the front pupil plane of said condenser.

10. The condenser of claim 9 wherein said negative lens has a focal length of about $-32.9$ to about $-89.6$.

11. The condenser of claim 8 further including a plano-concave negative lens to provide an air working distance, $S_{22}$, of 2.5 to 5mm.

12. The condenser of claim 11 wherein said negative lens has a concave radius, $R_{22}$, of 39.779mm, a thickness, $T_{21}$, of 3.60mm, an index of refraction, $ND_{21}$, of 1.689, an Abbe number, $\nu_{21}$, of 30.9 and the working distance is about 3.3mm.

* * * * *